United States Patent
Tonami et al.

(10) Patent No.: US 7,019,298 B2
(45) Date of Patent: Mar. 28, 2006

(54) RADIATION DETECTOR AND METHOD OF PRODUCING THE SAME

(75) Inventors: Hiromichi Tonami, Kyoto-fu (JP); Junichi Ooi, Muko (JP)

(73) Assignee: Shimadzu Corporation, Kyoto (JP)

( * ) Notice: Subject to any disclaimer, the term of this patent is extended or adjusted under 35 U.S.C. 154(b) by 263 days.

(21) Appl. No.: 10/774,450

(22) Filed: Feb. 10, 2004

(65) Prior Publication Data

US 2004/0155197 A1    Aug. 12, 2004

(30) Foreign Application Priority Data

Feb. 10, 2003    (JP) .............................. 2003-032522

(51) Int. Cl.
*G01T 1/20*    (2006.01)
(52) U.S. Cl. .................................. 250/368
(58) Field of Classification Search ............ 250/368
See application file for complete search history.

(56) References Cited

U.S. PATENT DOCUMENTS

| 4,743,764 A | 5/1988 | Casey et al. | |
|---|---|---|---|
| 6,552,348 B1 * | 4/2003 | Cherry et al. | 250/363.03 |
| 2003/0099118 A1 * | 5/2003 | Saitoh et al. | 362/561 |

* cited by examiner

*Primary Examiner*—David Porta
*Assistant Examiner*—Djura Malevic
(74) *Attorney, Agent, or Firm*—Manabu Kanesaka

(57) ABSTRACT

A radiation detector includes a plurality of scintillators closely arranged two-dimensionally, and a plurality of photoelectron multipliers optically connected to the scintillators. A number of photoelectron multipliers is less than that of the scintillators. A light guide is disposed between the scintillators and the photoelectron multipliers. The light guide is formed of a cured liquid resin and a lattice frame member integrally formed with the cured liquid resin. The lattice frame member forms partition walls in the cured liquid resin to provide compartments therein.

10 Claims, 4 Drawing Sheets

Fig. 5
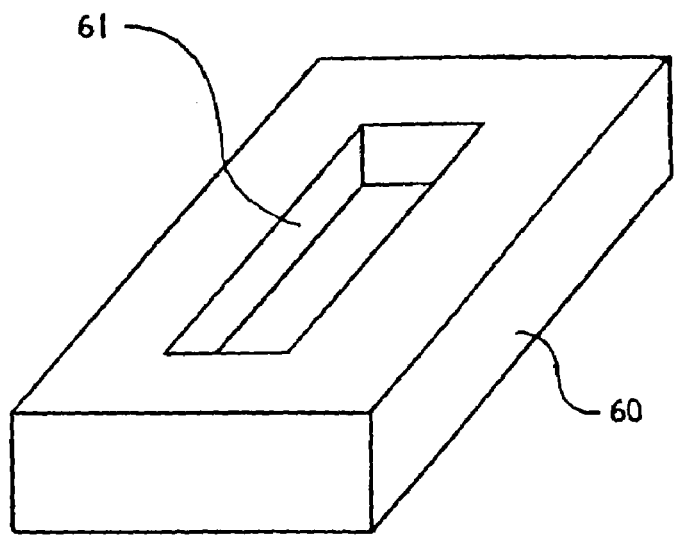
Fig. 6(a) Fig. 6(b)
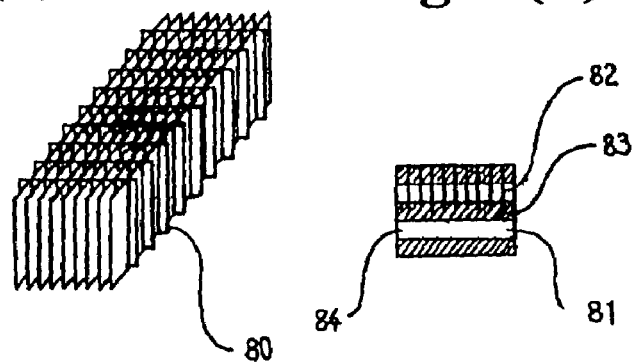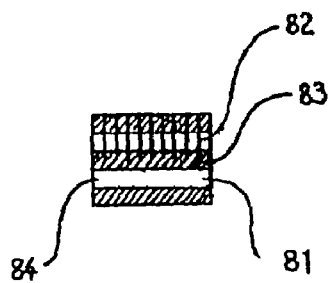
Fig. 7(a) Fig. 7(b)
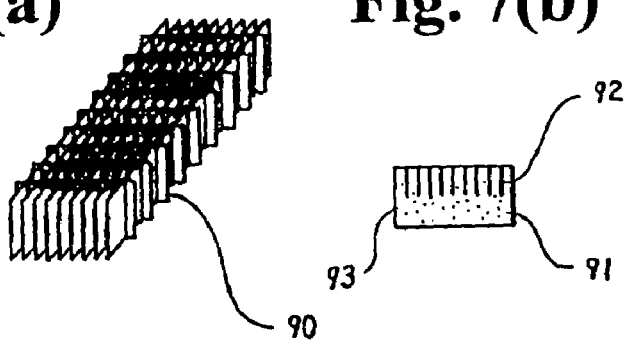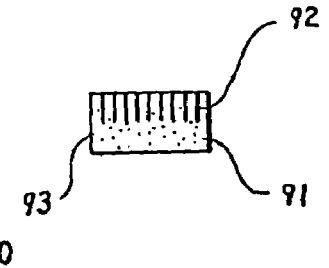

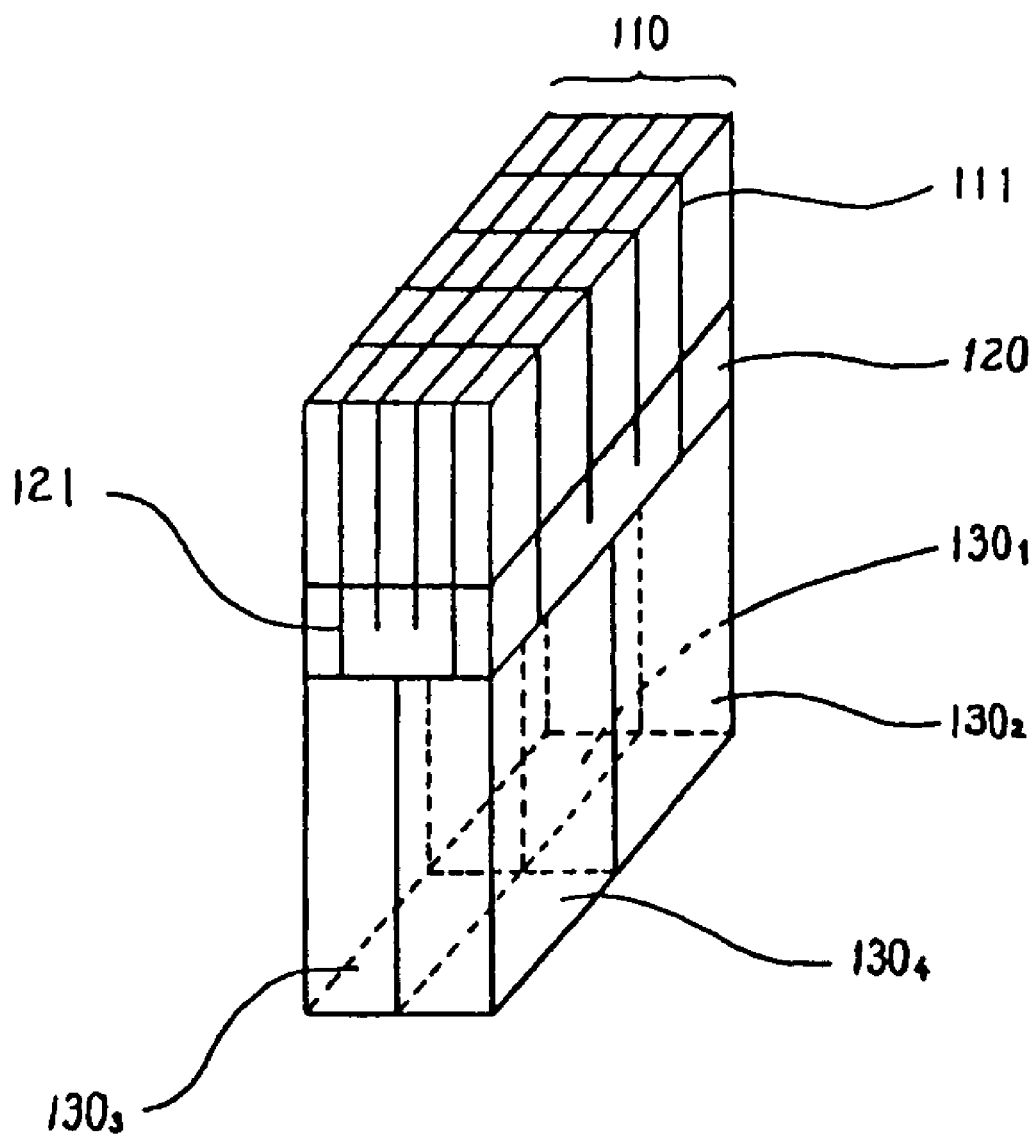

RADIATION DETECTOR AND METHOD OF PRODUCING THE SAME

BACKGROUND OF THE INVENTION AND RELATED ART STATEMENT

The present invention relates to a radiation detector used for a positron emission computed assisted tomography (PET), a single photon emission computed assisted tomography (SPECT) and the like, wherein the device detects a radioactive ray, i.e. gamma ray, emitted from a radioactive isotope (RI) administered to a subject and accumulated at a target region of the subject to thereby obtain a tomogram of an RI distribution at the target region. The present invention also relates to a method of producing the radiation detector.

A radiation detector is formed of a scintillator for receiving gamma rays emitted from a subject to emit light, and a photoelectron multiplier for converting the light emitted from the scintillator into an electrical pulse signal. A conventional radiation detector has a structure wherein a single scintillator corresponds to a single photoelectron multiplier. In recent years, a modified radiation detector has been developed to achieve high resolution with a minimum number of components. In such a modified radiation detector, a plurality of scintillator crystals is bundled into an array-form, and the photoelectron multipliers in the less number than that of the scintillator arrays are connected thereto, so that an incident position of the gamma ray is determined from an output ratio of the respective photoelectron multipliers.

In the recent method as described above, only the scintillator crystal, which the gamma ray enters, among the scintillator crystals constituting the array emits light. The incident position of the gamma ray is determined from an output ratio of the respective photoelectron multipliers receiving light emitted from the scintillator at a specific position. It is necessary to correctly determine the incident position for improving an image of a medical diagnosing device to which the radiation detector is applied. When the incident position of the gamma ray is determined from the output ratio of the photoelectron multipliers as described above, it is necessary to obtain a proper detection distribution in the adjacent photoelectron multipliers so that the distribution changes at a constant rate according to the light incident position. It is critical to properly distribute the scintillator light to the respective photoelectron multipliers in order to determine the incident position with high accuracy. To this end, various methods have been proposed.

Japanese Patent Publication (Kokai) No. 62-500957 has disclosed a radiation detector shown in FIG. 8. The radiation detector has a light guide disposed between scintillators and photoelectron multipliers. A plurality of barriers, i.e. light reflex barriers, is inserted into the light guide at various depths to determine the position. The radiation detector includes a plurality of scintillators 110 divided by slits 111 formed of a light reflex material or a light blocking member; a light guide 120 optically connected to the scintillators 110 and divided into small compartments with different depths by light reflex members or light blocking members; and four photoelectron multipliers $130_1$, $130_2$, $130_3$ and $130_4$.

In the radiation detector, the respective barriers 121 in the light guide 120 have lengths increasing toward an outer side from an inner side, so that the incident position of the gamma ray can be discriminated.

In the conventional radiation detector as described above, the light guide 120 is formed of an optically transparent material, and slits having predetermined depths are cut into the light guide 120 with a dicing saw or a wire saw. The light reflex members or light blocking members are inserted into the slits to form the barriers 121.

The conventional radiation detector as described above has the following problems. In recent years, a high-resolution radiation detector using super-sensitivity scintillators has been developed, wherein a large number of the scintillators are used as compared with the conventional radiation detector. Accordingly, a section of each scintillator becomes smaller than that of the conventional scintillator. In such a radiation detector, it is necessary to form the light guide optically connected to the scintillators with high accuracy, and to make a width between the barriers short so that the light transmission efficiency is not deteriorated.

In the conventional radiation detector, the slits with predetermined depths are formed in a block of an optically transparent material with a dicing saw or a wire saw, and the barriers are inserted into the slits. Accordingly, it is difficult to machine the block with high accuracy, and the slits tend to have rough surfaces and large widths. Also, in a case that the block is cut into nine pieces with the dicing saw or wire saw, and these pieces are assembled to form the slits, the process becomes complicated, resulting in high cost. Further, after the slits are machined or formed, the light reflex members are inserted. Accordingly, a gap is created between the light reflex member and the slit, thereby reducing the reflex efficiency. When the light output of the incident gamma ray is decreased, it is difficult to correctly determine the position, thereby reducing the whole image quality.

In view of the problems described above, the present invention has been made, and an object of the invention is to provide a radiation detector in which the position can be correctly determined and the whole image quality can be improved.

Another object of the invention is to provide a method of producing the radiation detector.

Further objects and advantages of the invention will be apparent from the following description of the invention.

SUMMARY OF THE INVENTION

In order to attain the above objects, according to an embodiment of the invention, a radiation detector includes a plurality of scintillators closely arranged two-dimensionally, and a plurality of photoelectron multipliers optically connected to the scintillators. The number of the photoelectron multipliers is less than that of the scintillators. A light guide is disposed between the scintillators and the photoelectron multipliers and divided into multiple compartments for position determination. A lattice frame member formed of partition walls is immersed in a light guide material in a liquid state, and the light guide material is hardened or cured to form the light guide.

The partition walls divide the light guide for discriminating a position, and are made of a known material such as a light reflex material, light blocking material, light transmitting material, half mirror and the like. For the position discrimination, the light guide is constructed so that a detection distribution in the adjacent photoelectron multipliers changes at a constant rate according to incidence positions of gamma rays entering the scintillators to obtain a proper detection distribution.

The light guide material includes a known material such as an epoxy resin, an acrylic resin or the like, and glass. The material may be transparent or become transparent after the curing. When the small compartments are formed, the lattice frame member formed of the partition walls is immersed in the light guide material in a liquid state. There is no specific limit in a viscosity of the liquid state as far as the lattice frame member can be immersed. Alternatively, the light guide material in a liquid state may be poured in a bath where the lattice frame member is placed. There is no limit with respect to the curing, and the material may be cured with time, heat, or external radiation such as light.

BRIEF DESCRIPTION OF THE DRAWINGS

FIGS. 4(a) and 4(b) are views showing a lattice frame member, wherein FIG. 4(a) is a perspective view thereof, and FIG. 4(b) is a side view showing a rectangular piece of the lattice frame member shown in FIG. 4(a);

FIG. 5 is a perspective view showing a bath according to an embodiment of the present invention;

FIGS. 6(a) and 6(b) are views showing a lattice frame member, wherein FIG. 6(a) is a perspective view thereof, and FIG. 6(b) is a side view thereof;

FIGS. 7(a) and 7(b) are views showing a lattice frame member, wherein FIG. 7(a) is a perspective view thereof, and FIG. 7(b) is a side view thereof; and FIG. 8 is a perspective view showing a conventional radiation detector.

DETAILED DESCRIPTION OF PREFERRED EMBODIMENTS

Figure 1:
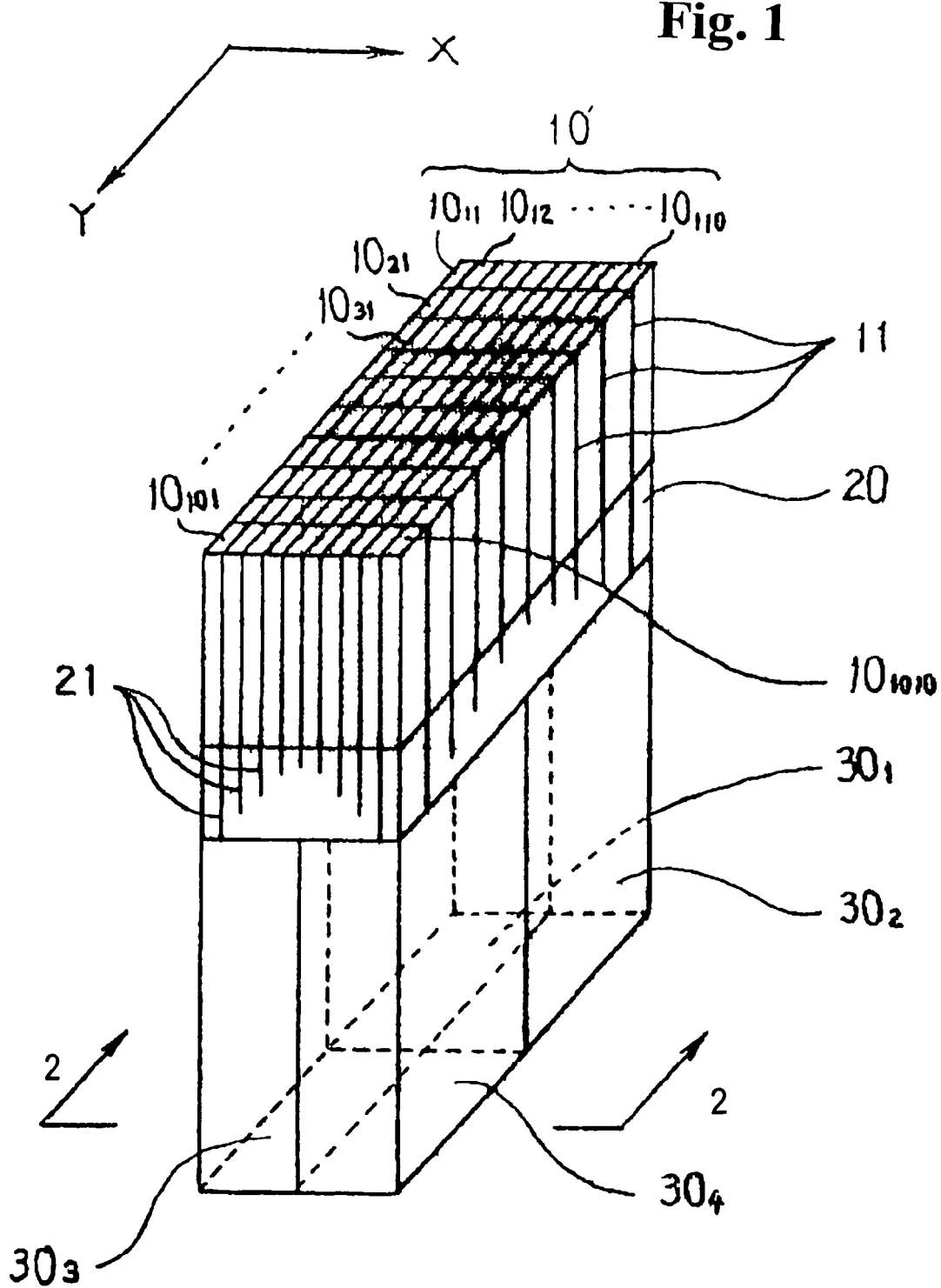
FIG. 1 is a perspective view showing a radiation detector according to an embodiment of the present invention.

Hereunder, embodiments of the invention will be explained with reference to the accompanying drawings. FIG. 1 is a perspective view of a radiation detector according to a first embodiment of the present invention, and FIG. 2 is a sectional view taken along line 2—2 in FIG. 1.

A radiation detector includes a plurality of scintillators 10 closely arranged two-dimensionally, a light guide 20 optically connected to the scintillators 10, and photoelectron multipliers $30_1$ to $30_4$ optically connected to the light guide 20. The scintillators 10 are formed of 10 pieces of the scintillators in an X-direction and 10 pieces of the scintillators in a Y-direction, i.e. a total of 100 scintillators. The scintillators 10 are divided by a plurality of slits 11 in which light reflex members or light blocking members are inserted. The light guide 20 are divided into small compartments with different depths by a plurality of partition walls 21 formed of a light reflex material or light blocking material. The scintillators 10 are formed of, for example, an inorganic crystal such as $Bi_4Ge_3O_{12}$ (BGO), $Gd_2SiO_5$ (GSO), $Lu_{2(1-x)}Ce_{2x}(SiO_4)O$ (LSO), NaI, $BaF_2$ and CsF.

Figure 2:
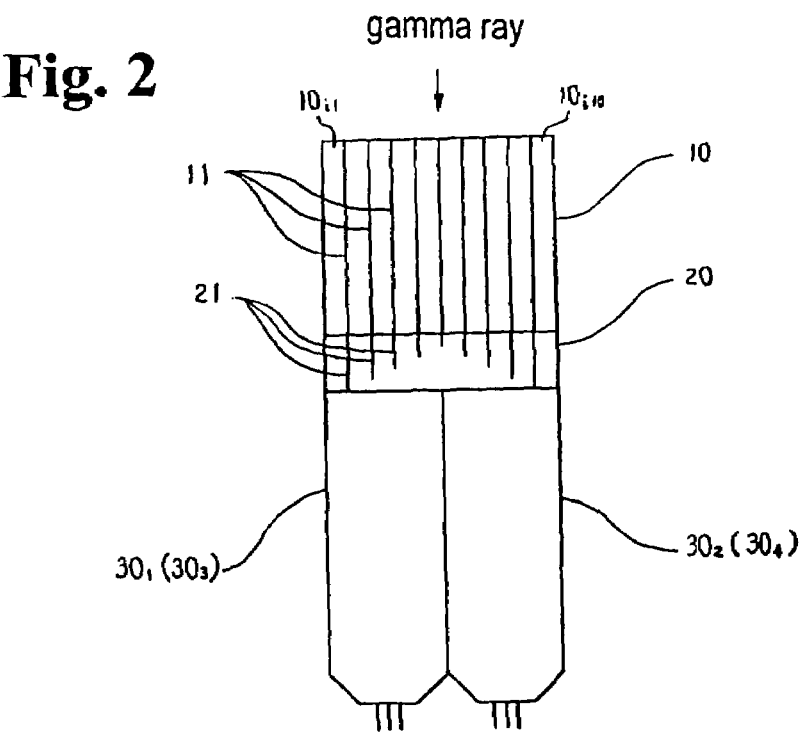
FIG. 2 is a sectional view of the radiation detector taken along line 2—2 in FIG. 1.

As shown in FIG. 2, gamma rays enter the scintillators $10_{i1}$–$10_{i10}$ (i is an integer from 1 to 10) disposed in the X direction, and are converted into visible light. The light is guided to the photoelectron multipliers 30 through the light guide 20. At that time, in order to determine the incidence positions in the scintillators 10, the partition walls 21 in the light guide 20 have various lengths so that an output ratio of the photoelectron multiplier $30_1$ ($30_3$) and the photoelectron multiplier $30_2$ ($30_4$) disposed in the X direction changes at a constant rate.

In other words, when an output of the photoelectron multiplier $30_1$ is $P_1$ and an output of the photoelectron multiplier $30_2$ is $P_2$, the partition walls 21 are arranged so that a calculated value, i.e. $(P_1-P_2)/(P_1+P_2)$, changes at a constant ratio according to positions of the scintillators $10_{i1}$–$10_{i10}$. More specifically, the partition walls 21 in the light guide 20 have the lengths increasing toward peripheral sides from the center.

The scintillators $10_{1j}$–$10_{10j}$ (j is an integer from 1 to 10) are arranged in the Y direction. The light is guided into the photoelectron multipliers through the light guide 20. The partition walls 21 in the light guide 20 have various lengths so that an output ratio of the photoelectron multiplier $30_1$ ($30_2$) and the photoelectron multiplier $30_3$ ($30_4$) disposed in the Y direction changes at a constant ratio.

Incidentally, outer surfaces of the respective scintillators are covered with a reflection material (not shown) except opposing surfaces and surfaces optically connected to the photoelectron multipliers.

Figure 3:
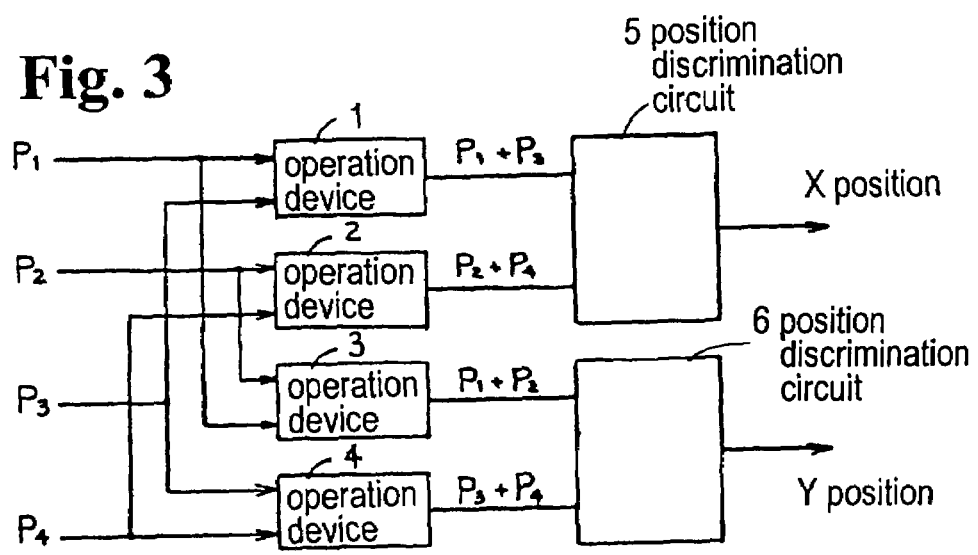
FIG. 3 is a block diagram showing a position detecting portion.

FIG. 3 is a block diagram showing a structure of a position detecting unit for detecting the incidence positions of the gamma rays based on the outputs of the photoelectron multipliers $30_1$ to $30_4$. As shown in FIG. 3, in order to detect the incidence positions in the X direction of the gamma rays, an output $P_1$ of the photoelectron multiplier $30_1$ and an output $P_3$ of the photoelectron multiplier $30_3$ are inputted into an operation device 1, and an output $P_2$ of the photoelectron multiplier $30_2$ and an output $P_4$ of the photoelectron multiplier $30_4$ are inputted into an operation device 2.

The outputs $P_1+P_3$ and $P_2+P_4$ of the operation devices 1 and 2 are inputted into a position discrimination circuit 5, and the incidence positions of the gamma rays in the X direction are obtained based on the outputs. In the same manner, in order to detect the incidence positions of the gamma rays in the Y direction, the output $P_1$ of the photoelectron multiplier $30_1$ and the output $P_2$ of the photoelectron multiplier $30_2$ are inputted into an operation device 3, and the output $P_3$ of the photoelectron multiplier $30_3$ and the output $P_4$ of the photoelectron multiplier $30_4$ are inputted into an operation device 4. The outputs $P_1+P_2$ and $P_3+P_4$ of the operation devices 3 and 4 are inputted into a position discrimination circuit 6, and the incidence positions of the gamma rays in the Y direction are obtained based on the outputs.

Figure 4A:
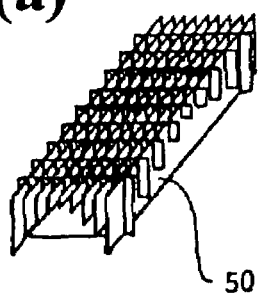
Figure 4B:
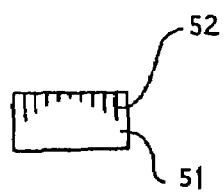

A method of producing the radiation detector will be explained next. FIG. 4(a) is a lattice frame member 50 formed of a plurality of thin rectangular pieces 51 made of a light reflex material, light blocking material or light transmitting material. The lattice frame member 50 is formed such that a plurality of grooves 52 is provided in each rectangular piece 51, and the rectangular pieces 51 are combined with each other. The light reflex material and light blocking material include a polyester film having a multi-layer structure of $SiO_2$ and $TiO_2$; a well-polished aluminum; a thin base plate coated with titanium oxide or barium sulfate; a thin base plate with a white fluoride resin tape; a thin smooth base plate with aluminum deposited thereon; or the like.

The rectangular piece 51 is formed with dicing cut, a cutting tool, etching, laser machining, punching or the like. Since the rectangular piece is a thin plate, it is easy to accurately cut the rectangular piece.

As shown in FIG. 5, a bath 60 has a concave portion 61 having an area, a depth and a shape for completely retaining the lattice frame member 50. A mold release is coated beforehand so that the light guide is smoothly removed from the bath 60. After removing bubbles, an optically transparent liquid resin (not shown) such as an epoxy resin and acrylic resin is poured in the bath 60, and the lattice frame member 50 is immersed therein. After the liquid resin is hardened or cured, the light guide 20 formed of the lattice frame member 50 and the resin is taken out, and a contour of the light guide 20 is finished in a specific shape with cutting, grinding or the like.

In the embodiment of the present invention, the light guide 20 is formed with the method described above. Accordingly, as compared with a conventional light guide processed with a dicing saw or wire saw, the light guide 20 provides the radiation detector with high accuracy, a high resolution, and the scintillator has a small section.

In the embodiment, it is easy to make the light reflex members and light blocking members have a specific thickness, and no gap is created between the transparent resin and the light guide 20, thereby improving reflecting efficiency. Accordingly, it is possible to obtain a strong output of the incident gamma ray to determine the position correctly, thereby improving the whole image quality. Also, it is possible to reduce the number of parts and the assembling steps, resulting in lower cost.

In the embodiment described above, the radiation detector has 100 scintillators, the light guide, and four of the photoelectron multipliers, respectively. The present invention is not limited thereto, and the numbers of the scintillators and the photoelectron multipliers can be modified.

As shown in FIGS. 6(a) and 6(b), according to another embodiment, a rectangular piece 81 is formed of a thin optically transparent film 84, and a part of the rectangular piece 81 is coated with titanium oxide as a light reflex material 83. Grooves 82 are formed in the rectangular pieces 81, and a plurality of the rectangular pieces 81 is joined to obtain a lattice frame member 80. In this case, a ratio of an area coated with the light reflex material 83 and a non-coated area is experimentally determined so that the output ratio of the photoelectron multiplier $30_1$ ($30_3$) and the photoelectron multiplier $30_2$ ($30_4$) disposed in the X direction and optically connected to the light guide formed of the lattice frame member 80 changes at a constant rate (see FIG. 2).

More specifically, when the output of the photoelectron multiplier $30_1$ is $P_1$ and the output of the photoelectron multiplier $30_2$ is $P_2$, the area coated with the light reflex material 83 is determined so that the calculated value, i.e. $(P_1-P_2)/(P_1+P_2)$, changes at a constant ratio according to the positions of the scintillators $10_{i1}-10_{i10}$.

In the rectangular piece 81, the thin optically transparent film 84 may be coated with barium sulfate, attached to a white fluoro-resin tape, deposited with aluminum, or attached to a polyester film having a multi-layer structure of $SiO_2$ and $TiO_2$ as the light reflex material. Accordingly, a part of the rectangular piece 81 transmits light, and the remaining part reflects light to form the rectangular lattice frame member 80. The thin optically transparent film 84 is preferably formed of a polyethylene terephthalate (PET) film, Lumirror film and the like. The light guide may be formed with the method same as that in the first embodiment.

According to a third embodiment of the present invention, as shown in FIGS. 7(a) and 7(b), a rectangular piece 91 is formed of a thin half-mirror material 93 having both reflection and transmission of light. Grooves 92 are provided in the rectangular pieces 91, and the rectangular pieces 91 are joined to thereby form a lattice frame member 90. In this case, a degree of transmittance of the half-mirror material 93 is experimentally determined so that the output ratio of the photoelectron multiplier $30_1$ ($30_3$) and the photoelectron multiplier $30_2$ ($30_4$) disposed in the X direction and optically connected to the light guide formed of the lattice frame member 90 changes at a constant rate (see FIG. 2).

More specifically, when the output of the photoelectron multiplier $30_1$ is $P_1$ and the output of the photoelectron multiplier $30_2$ is $P_2$, the degree of transmittance of the half-mirror material 93 is determined so that the calculated value, i.e. $(P_1-P_2)/(P_1+P_2)$, changes at a constant ratio according to the positions of the scintillators $10_{i1}-10_{i10}$. The light guide may be formed with the method same as that in the first embodiment.

As described above, in the embodiments of the present invention, the light guide 20 is formed with the methods described above. Accordingly, as compared with a conventional light guide processed with a dicing saw or wire saw, the light guide 20 is suitable for the radiation detector with high accuracy, a high resolution and a small section of the scintillator.

In the embodiments, it is easy to make the light reflex members and light blocking members at a specific thickness, and no gap is created between the transparent resin and the light guide 20, thereby improving reflecting efficiency. Accordingly, it is possible to obtain a strong output of the incident gamma ray and to determine the position correctly, thereby improving the whole image quality. Also, it is possible to reduce the number of parts and the assembling steps, resulting in lower cost.

While the invention has been explained with reference to the specific embodiments of the invention, the explanation is illustrative and the invention is limited only by the appended claims.

What is claimed is:

1. A radiation detector comprising:
   a plurality of scintillators closely arranged two-dimensionally,
   a plurality of photoelectron multipliers optically connected to the scintillators, a number of photoelectron multipliers being less than that of the scintillators, and
   a light guide disposed between the scintillators and the photoelectron multipliers and formed of a cured liquid resin and a lattice frame member integrally formed with the liquid resin when cured, said lattice frame member forming partition walls in the cured liquid resin to provide compartments therein.

2. A radiation detector as claimed in claim 1, wherein said lattice frame member is formed of at least one material selected from the group consisting of a light reflex material, light blocking material, light transmitting material, and half-mirror.

3. A radiation detector as claimed in claim 1, wherein said lattice frame member is formed of sheet members assembled together to form the partition walls.

4. A radiation detector as claimed in claim 3, wherein each of the sheet members has a first portion where light transmits and a second portion where light does not transmit.

5. A radiation detector as claimed in claim 4, wherein said second portion is formed of a transparent sheet member attached to a layer for blocking light.

6. A method of producing a radiation detector, comprising:
   preparing a lattice frame member formed of sheet members,
   disposing the lattice frame member in a liquid resin,
   hardening the liquid resin with the lattice frame member therein to obtain a light guide, and
   assembling the liquid guide between a scintillator unit formed of a plurality of scintillators and a photoelectron multiplier unit formed of a plurality of photoelectron multipliers.

7. A method of producing a radiation detector as claimed in claim 6, wherein in forming the liquid guide, the lattice frame member is disposed in a bath, the liquid resin is pored into the bath, and then, the liquid resin is cured for hardening.

8. A method of producing a radiation detector as claimed in claim 6, wherein said sheet member is formed of at least one material selected from the group consisting of a light reflex material, light blocking material, light transmitting material, and half-mirror.

9. A method of producing a radiation detector as claimed in claim 6, wherein each of said sheet members has a first portion where light transmits and a second portion where light does not transmit.

10. A method of producing a radiation detector as claimed in claim 9, wherein said second portion is formed of a transparent sheet member attached to a layer for blocking light.

* * * * *